(12) United States Patent
van Dijk et al.

(10) Patent No.: US 12,425,066 B2
(45) Date of Patent: Sep. 23, 2025

(54) CAN TRANSCEIVER AND METHOD FOR THE CAN TRANSCEIVER

(71) Applicant: NXP B.V., Eindhoven (NL)

(72) Inventors: Lucas Pieter Lodewijk van Dijk, Kranenburg (DE); Gerald Kwakernaat, Malden (NL)

(73) Assignee: NXP B.V., Eindhoven (NL)

( * ) Notice: Subject to any disclaimer, the term of this patent is extended or adjusted under 35 U.S.C. 154(b) by 100 days.

(21) Appl. No.: 18/484,852

(22) Filed: Oct. 11, 2023

(65) Prior Publication Data

US 2024/0178875 A1 May 30, 2024

(30) Foreign Application Priority Data

Nov. 28, 2022 (EP) .................................. 22210039

(51) Int. Cl.
*H04B 1/40* (2015.01)
*H04L 12/40* (2006.01)

(52) U.S. Cl.
CPC ............... *H04B 1/40* (2013.01); *H04L 12/40* (2013.01); *H04L 2012/40215* (2013.01)

(58) Field of Classification Search
CPC . H04B 1/40; H04L 12/40; H04L 2012/40215; H04L 12/40169
USPC ................... 375/219–22, 295–297, 219–222
See application file for complete search history.

(56) References Cited

U.S. PATENT DOCUMENTS

| | | | |
|---|---|---|---|
| 2002/0097789 A1 | 7/2002 | Muth | |
| 2004/0153870 A1 | 8/2004 | Konz et al. | |
| 2012/0051241 A1* | 3/2012 | Mori | H04L 12/40039 370/465 |
| 2013/0307498 A1* | 11/2013 | Jiang | G05F 1/10 323/271 |
| 2014/0365693 A1* | 12/2014 | Monroe | G06F 3/00 710/105 |
| 2015/0085411 A1* | 3/2015 | Yang | H02H 9/02 361/57 |
| 2018/0041358 A1* | 2/2018 | Kishigami | H04L 43/0823 |

(Continued)

FOREIGN PATENT DOCUMENTS

EP 3930265 A1 12/2021

OTHER PUBLICATIONS

Infineon; "TLE9250V High Speed CAN Transciever"; Product Data Sheet; Rev. 1.11; 27 pages (Sep. 19, 2019).

(Continued)

*Primary Examiner* — Emmanuel Bayard (57) ABSTRACT

The present disclosure relates to a CAN transceiver, comprising: a transmit data, TXD, interface, a CAN BUS interface, a first control interface, a transmitter, and a control unit, wherein the transmitter comprises a first driver path coupled to the CAN bus interface and comprising a first series circuit including first and second switch units the transmitter comprises a second driver path coupled to the CAN bus and comprising a second series circuit including third and fourth switch units, the transmitter comprises a driver unit configured to control the first and third switch units based on a TXD signal, and the control unit is configured to control the switch units based on a first control signal at the first control interface and, if the first control signal represents a deactivation message, to deactivate at least one switch unit of each driver path.

17 Claims, 4 Drawing Sheets

(56) References Cited

U.S. PATENT DOCUMENTS

| | | | |
|---|---|---|---|
| 2019/0044750 A1 | 2/2019 | Granados et al. | |
| 2020/0287746 A1* | 9/2020 | Kotani | H04L 12/40143 |
| 2021/0120017 A1* | 4/2021 | Antonsson | G01R 27/16 |
| 2021/0167989 A1* | 6/2021 | Broughton | H04L 12/40013 |
| 2021/0243049 A1 | 8/2021 | Kuwata | |
| 2021/0377060 A1* | 12/2021 | Muth | G06F 13/4072 |
| 2022/0123958 A1* | 4/2022 | Repp | H03K 17/6872 |

OTHER PUBLICATIONS

Infineon; "TLE9350SJ High speed Can Fd transciever"; Product Data Sheet; Rev. 1.2; 30 pages (Mar. 18, 2022).
NXP; "TJA1043 High-speed CAN transciever"; Product Data Sheet; Rev. 6; 32 pages (Nov. 10, 2017).
NXP; "TJA1051 High-speed CAN transciever"; Product Data Sheet; Rev. 9; 25 pages (Nov. 28, 2017).
Texas Instruments; "TCAN1043-Q1 Automotive Low-Power Fault Protected Can FD Transceiver with Sleep Mode"; Product Data Sheet; 55 pages (Jan. 2021—Revised Mar. 2023).
Texas Instruments; "TCAN1463-Q1 Automotive Signal Improvement Capable Can FD Transceiver with Sleep Mode"; Product Data Sheet; 55 pages (Mar. 2020—Revised Dec. 2022).

* cited by examiner

CAN TRANSCEIVER AND METHOD FOR THE CAN TRANSCEIVER

CROSS-REFERENCE TO RELATED APPLICATIONS

This application claims priority under 35 U.S.C. § 119 to European patent application no. 22210039.8, filed Nov. 28, 2022, the contents of which are incorporated by reference herein.

TECHNICAL FIELD

The present disclosure relates to a Controller Area Network, CAN, Transceiver and a method for the CAN transceiver

BACKGROUND

CAN buses can be used for communications within vehicles, in particular within automobiles. It will be appreciated that CAN buses also have application outside of the field of automobiles. A CAN bus network may include multiple bus devices, so called nodes or electronic control units (ECUs), such as an engine control module (ECM), a power train control module (PCM), airbags, antilock brakes, cruise control, electric power steering, audio systems, windows, doors, mirror adjustment, battery and recharging systems for hybrid/electric cars, and many more. A CAN protocol is used to enable communications between the various bus devices. The data link layer of the CAN protocol is standardized as International Standards Organization (ISO) 20698-1:2003. CAN Flexible Data-Rate or "CAN FD," which is an extension of the standardized CAN data link layer protocol and is meanwhile integrated into the ISO20698-1:2015 standard, can provide higher data rates. The standardized CAN data link layer protocol is being further extended to provide even higher data rates. A further extension, referred to as CAN XL, with a new level scheme allowing even higher data rates is in the definition phase discussed under CiA610 (CAN in Automation) and is moving towards standardization in the form of either a further update of the existing ISO20698 standards or a new standard.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Aspects of the disclosure are defined in the accompanying claims.

In accordance with a first aspect of the present disclosure, a controller area network, CAN, transceiver is provided, wherein the CAN transceiver comprising: a transmit data, TXD, interface, a receive data, RXD, interface, a CAN BUS interface, a first control interface, a transmitter, a receiver, and a control unit, wherein a transmitter input of the transmitter is coupled to the TXD interface for receiving a TXD signal, wherein a transmitter output of the transmitter is coupled to the CAN BUS interface, wherein the receiver is coupled between the CAN BUS interface and the RXD interface, wherein the transmitter comprises a first driver path comprising a first series circuit comprising a first switch unit and a second switch unit, wherein the transmitter comprises a second driver path comprising a second series circuit with a third switch unit and a fourth switch unit, wherein the first driver path is coupled to a first terminal of the CAN BUS interface and the second driver path is coupled to a second terminal of the CAN BUS interface, wherein the transmitter comprises a driver unit configured to control the first switch unit and the third switch unit based on the TXD signal, wherein the control unit is coupled to the first control interface for receiving a first control signal, wherein the control unit is coupled to at least one switch unit of the first driver path and to at least one switch unit of the second driver path to control the switch units coupled to the control unit, wherein the control unit is configured, if the first control signal represents a deactivation message, to deactivate at least one switch unit of each driver path.

In one or more embodiments, the first driver path is coupled between a first voltage supply terminal of the CAN transceiver and the first terminal of the CAN BUS interface, and wherein the second driver path is coupled between a second voltage supply terminal of the CAN transceiver and the second terminal of the CAN BUS interface.

In one or more embodiments, the first driver path comprises a further, fifth switch unit and the second driver path comprises a further, sixth switch unit.

In one or more embodiments, the driver unit is coupled to a control terminal of the first switch unit via a first control signal path, the transmitter comprising a seventh switch unit integrated into the first control signal path, wherein the driver unit is coupled to a control terminal of the third switch unit via a second control signal path, wherein the transmitter comprises an eighth switch unit integrated into the second control signal path, wherein the control unit is coupled to the seventh and eighth switch units to control the seventh and eighth switch units, and wherein the control unit is configured, if the first control signal represents a deactivation message, to deactivate the seventh and eighth switch units.

In one or more embodiments, the control unit is coupled to the control terminal of the first switch unit via a ninth switch unit to control the first switch unit, wherein the control unit is coupled to the control terminal of the third switch unit via a tenth switch unit to control the third switch unit, and wherein the control unit is configured, if the first control signal represents a deactivation message, to deactivate the first and third switch units.

In one or more embodiments, the control unit is coupled to a control terminal of the second switch unit via an eleventh switch unit to control the second switch unit, wherein the control unit is coupled to a control terminal of the fourth switch unit via a twelfth switch unit to control the fourth switch unit, and wherein the control unit is configured, if the first control signal represents a deactivation message, to deactivate the second and fourth switch units.

In one or more embodiments, the first and second switch units of the first driver path are arranged such that along the first driver path the second switch unit is arranged closer than the first switch unit to the first port of the CAN BUS interface.

In one or more embodiments, the fifth and first switch units of the first driver path are arranged such that along the first driver path that the first switch unit is arranged closer than the fifth switch unit to the first terminal of the CAN BUS interface.

In one or more embodiments, the third and fourth switch units of the second driver path are arranged such that along the second driver path the fourth switch unit is arranged closer than the third switch unit to the second terminal of the CAN BUS interface.

In one or more embodiments, the sixth and third switch units of the second driver path are arranged such that along the second driver path the third switch unit is arranged closer than the sixth switch unit to the second terminal of the CAN BUS interface.

In one or more embodiments, the TXD interface is coupled to a driver input of the driver unit via the transmitter input and a TXD signal path, wherein the transmitter comprises a thirteenth switch unit integrated with the TXD signal path, wherein the control unit is coupled to the thirteenth switch unit to control the thirteenth switch unit, and wherein the control unit is configured, if the first control signal represents a deactivation message, to deactivate the thirteenth switch unit.

In one or more embodiments, the CAN transceiver comprises a second control interface, wherein the control unit is coupled to the second control interface to receive a second control signal, wherein the control unit is configured to control the CAN transceiver based on the second control signal.

In one or more embodiments, the control unit is configured to activate the second, fourth, seventh, eighth, and thirteenth switch units if the second control signal represents an activated mode of operation and if the first control signal does not represent a deactivation message.

In one or more embodiments, the control unit is configured, if the second control signal represents a deactivated mode of operation and if the first control signal does not represent a deactivation message, to activate the second, fourth, seventh, and eighth switch units and to deactivate the thirteenth switch unit.

According to a second aspect of the present disclosure, a method for a Control Area Network, CAN, transceiver is provided, wherein the CAN transceiver comprising a transmit data, TXD, interface, a receive data, RXD, interface, a CAN BUS interface, a first control interface, a transmitter, a receiver, and a control unit, wherein a transmitter input of the transmitter is coupled to the TXD interface to receive a TXD signal, wherein a transmitter output is coupled to the CAN BUS interface, wherein the receiver is coupled between the CAN BUS interface and the RXD interface, wherein the transmitter comprises a first driver path comprising a first series circuit with a first switch unit and a second switch unit, wherein the transmitter comprises a second driver path comprising a second series circuit comprising a third switch unit and a fourth switch unit, wherein the first driver path is coupled to a first terminal of the CAN BUS interface and the second driver path is coupled to a second terminal of the CAN BUS interface, wherein the transmitter comprises a driver unit configured to control the first switch unit and the third switch unit based on the TXD signal, wherein the control unit is coupled to the first control interface, wherein the control unit is coupled to at least one switch unit of the first driver path and to at least one switch unit of the second driver path, and wherein the method comprising the following steps: a) receiving a first control signal by the control unit via the first control interface; and b) controlling by the control unit the switch units coupled to the control unit if the first control signal represents a deactivation message, such that at least one switch unit of each driver path is deactivated.

DESCRIPTION OF DRAWINGS

Embodiments of the present disclosure will be described in more detail with reference to the appended drawings. It is to be noted, however, that the appended drawings illustrate only typical embodiments of this invention and are therefore not to be considered limiting of its scope, for the invention may admit to other equally effective embodiments. Advantages of the subject matter claimed will become apparent to those skilled in the art upon reading this description in conjunction with the accompanying drawings, in which like reference numerals have been used to designate like elements, and in which:

DESCRIPTION OF EMBODIMENTS

Figure 1:
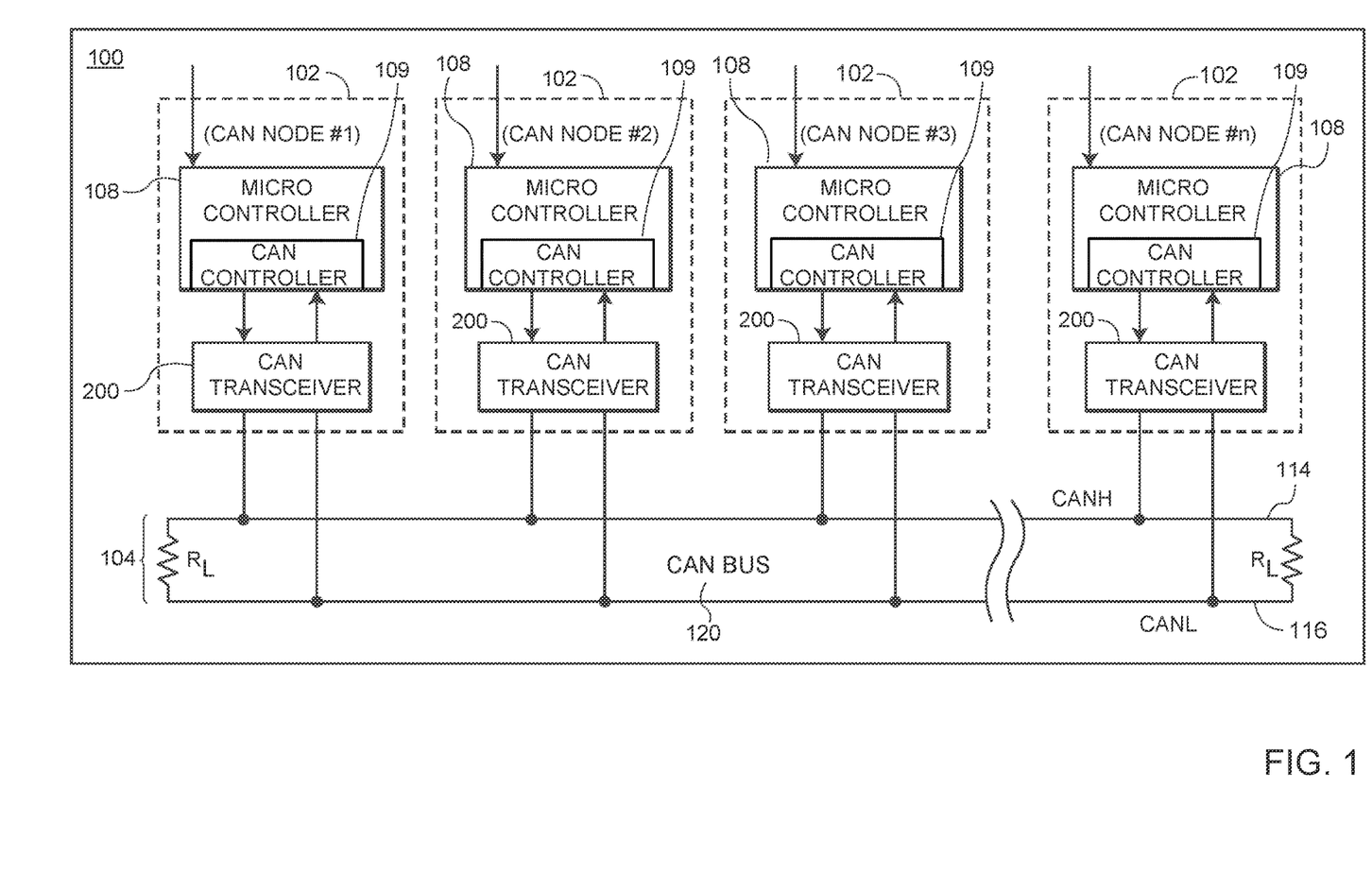
FIG. 1 shows a simplified block diagram of a CAN System.

FIG. 1 schematically depicts an example of a CAN system 100 that is known in the field. The CAN system may include multiple CAN nodes 102 or "ECUs" 102, each connected to a CAN BUS network 104. In the embodiment of FIG. 1, each CAN node 102 includes a microcontroller 108 and a CAN transceiver 200. The microcontroller 108 may be embedded in a microcontroller of the CAN node 102. The microcontroller 108 may be referred to as a microcontroller 108. The CAN transceiver 200 may be referred to as a transceiver 200.

The microcontrollers 108 are typically connected directly or indirectly to at least device outside the system 100, such as an switch, a main controller, an actuator, or some other control device. The microcontrollers 108 are often programmed to determine the meaning of received messages and to generate appropriate outgoing messages. A processing unit 110 of a microcontroller 108 may also be referred to as host processors, hosts or digital signal processors (DSPs). In an embodiment, the processing unit of the microcontroller supports application software that interacts with the interfaces of the microcontroller 108. Each microcontroller 108 may have an embedded CAN Protocol controller 109, which may also be referred to as a CAN controller 109. The microcontrollers 108 may be configured to support application software that interacts with the CAN controller 109.

The CAN BUS network 104 carries analog differential signals and includes a first CAN signal line 114, which is also referred to as the CAN high (CANH) bus line 114, and a second CAN signal line 116, which is also referred to as the CAN low (CANL) bus line 116. The CAN BUS network 104 is known in the field.

Figure 2:
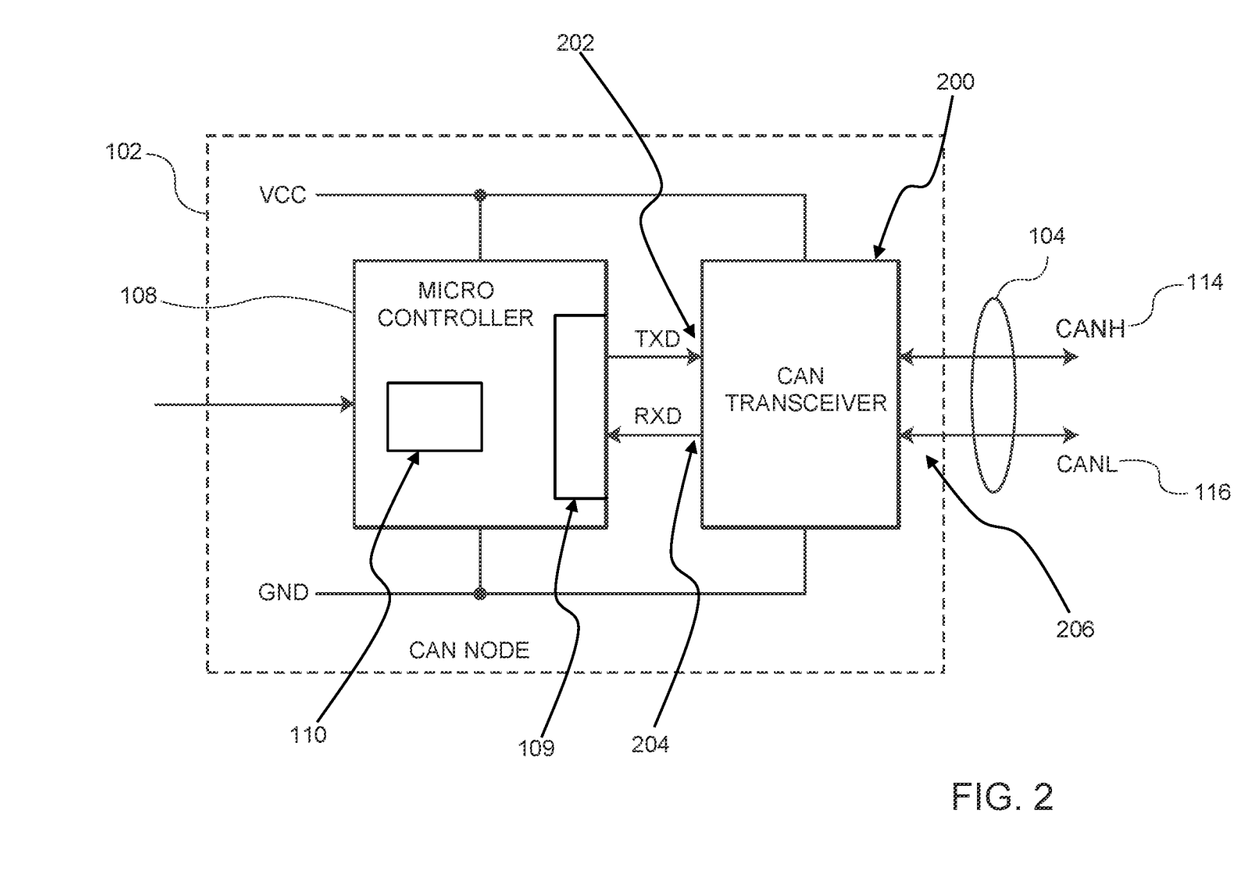
FIG. 2 shows a simplified block diagram of a CAN Node.

FIG. 2 depicts an expanded view of one CAN device 102 from FIG. 1. In the expanded view of FIG. 2, the microcontroller 108 comprises a processing unit 110, which may, for example, run a software application that is stored in a memory of the microcontroller 108 and executed by processing circuits of the microcontroller 108. The microcontroller 108 and the CAN transceiver 200 of the CAN device 102 are connected between a first supply voltage, VCC, and as second supply voltage, which is usually ground, GND. As illustrated in FIG. 2, data communicated from microcontroller 108 to the CAN transceiver 200 is identified as transmit data (TXD) and data communicated from the CAN transceiver 200 to the microcontroller 108 is referred to as receive data (RXD). Throughout the description, TXD is carried on a TXD path and RXD is carried on an RXD path. The CAN transceiver comprises a BUS interface to communicate messages to and from the CAN BUS network 104 via the CANH and CANL bus lines 114 and 116, respectively.

The data link layer operations between the microcontroller 108 and the CAN transceiver 200 is known in the field. For example, in receive operations, the microcontroller 108 receives from the transceiver 200 a digital RXD signal via the RXD path. The RXD signal may represent an CAN message. The microcontroller 108 may store the received CAN message. The CAN message complies with the frame format of the CAN protocol, in particular with the CAN FD format and/or the CAN XL format. In transmit operations, the microcontroller 108 transmits a TXD signal, which also represents a CAN message, via the TXD path to the CAN transceiver 200. The CAN message typically complies with the frame format of the CAN protocol, in particular with the CAN FD format and/or the CAN XL format.

The CAN transceiver 200 is located between the microcontroller 108 and the CAN BUS network 104. The CAN transceiver 200 is configured to implement physical layer operations according to the CAN protocol as known in the field.

For example, in receive operations, a CAN transceiver 200 converts analog differential signals from the CAN BUS network 104 to the RXD signal that the microcontroller 108 can interpret. The CAN transceiver 200 may also protects the microcontroller 108 from extreme electrical conditions on the CAN BUS network 104. e.g., electrical surges.

In transmit operations, the CAN transceiver 200 can convert the TXD signal received via the TXD path from the microcontroller 108 into analog differential signals that are sent over a CAN BUS interface 206 on the CAN BUS network 104. The CAN BUS interface 206 is adapted to be connected to the first and second CAN BUS signal lines 114, 116.

To test the operability of a CAN transceiver 200, it is possible for the microcontroller 108 to send a TXD test message to the CAN transceiver 200. Based on the TXD test message, the CAN transceiver 200 may generate a CAN BUS signal at the CAN BUS interface 206 representing the TXD test message. The CAN BUS signal is also sensed by the CAN transceiver 200, such that the CAN transceiver 200 generates an RXD test message based on the sensed CAN BUS signal. The RXD test message may be transmitted from the CAN transceiver 200 to the microcontroller 108. The microcontroller 108 may determine whether the CAN transceiver 200 is faulty based on a comparison between the TXD test message and the RXD test message. If the RXD test message corresponds to the TXD test message, there is no fault in the CAN transceiver 200.

Sending the CAN BUS signal representing the TXD message results in a load on the CAN BUS network 120. If a CAN system 100 includes a large number of CAN devices 102, and if the operability of the CAN transceiver 200 of each of the CAN devices 102 is tested, this results in a significant overall load on the CAN BUS network 120. It is desirable to avoid this significant overall load on the CAN BUS network.

Furthermore, testing the operability of a CAN transceiver 200 can lead to a significant expenditure of time, because the TXD test message must first win as part of the usual arbitration in accordance with the CAN standard, so that only the arbitration won the CAN transceiver 200 will generate the CAN BUS signal that represents the TXD test message. Until the arbitration is won, a significant time delay may have occurred. As a result, testing the operability of the CAN transceiver often involves a considerable amount of time during which the CAN transceiver 200 is not available to send regular TXD messages. It is desirable to reduce the aforementioned time expenditure.

Figure 3:
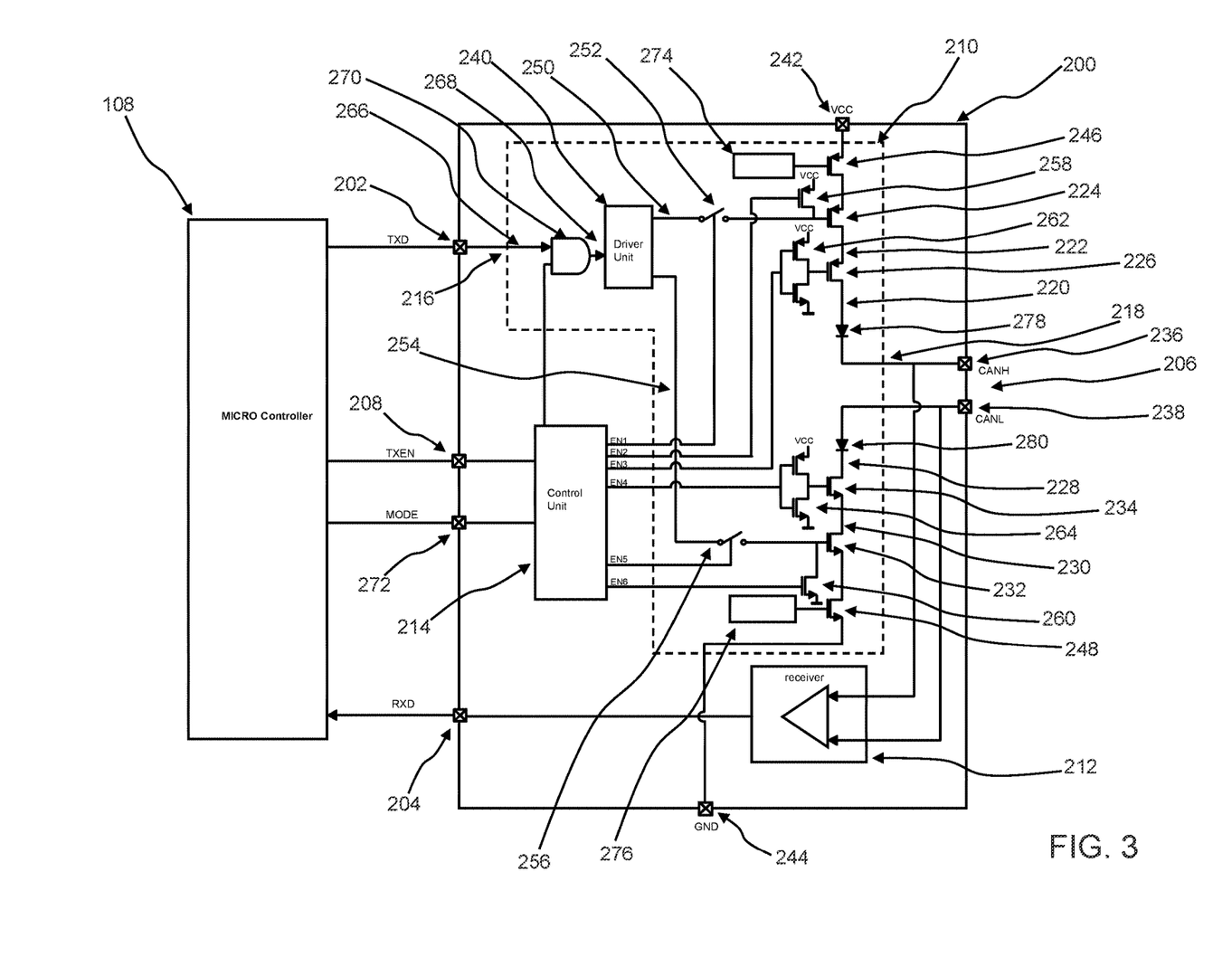
FIG. 3 shows a simplified block diagram of a CAN Transceiver.

FIG. 3 schematically illustrates an example of a CAN transceiver 200 according to the present disclosure.

FIG. 3 schematically illustrates an example of an embodiment of the CAN transceiver 200. FIG. 3 also schematically illustrates a microcontroller 108 that can be coupled to the CAN transceiver 200. Together, the microcontroller 108 and the CAN transceiver 200 may form an example of an embodiment of a CAN device 102. The following explanations in connection with the CAN transceiver 200 may therefore refer both to the CAN transceiver 200 as such (and thus independently of the microcontroller 108 and/or the CAN device 102) and to the CAN transceiver 200 in the CAN device 102.

The CAN transceiver 200 has a transmit data, TXD, interface 202, a receive data, RXD, interface 204, a CAN BUS interface 206, a first control interface 208, a transmitter 210, a receiver 212, and a control unit 214.

The transmitter 210 comprises a transmitter input 216. The transmitter input 216 may be a physical or logical interface. The transmitter input 216 of the transmitter 210 is coupled to the TXD interface 202. In particular, a signal connection may extend from the TXD interface 202 to the transmitter input 216. The TXD interface 202 is preferably a physical interface. Further, another signal connection may extend from the microcontroller 108 to the TXD interface 202. The transmitter 210 may receive a TXD signal via the TXD interface 202. In an example, the transmitter 210 may receive the TXD signal from the microcontroller 108. The TXD signal may represent a message, which may be referred to as a TXD message. The TXD message may be a message according to the CAN standard. Preferably, the TXD signal is a digital signal.

The transmitter 210 also comprises a transmitter output 218. The transmitter output 218 may be configured as a logical interface or as a physical interface. The transmitter output 218 of the transmitter 210 is coupled to the CAN BUS interface 206. The transmitter output 218 may also comprise two internal terminals. The terminals of the transmitter output 218 may be connected via two (separate) signal connections to the terminals 236, 238 of the CAN bus interface 206. The transmitter 210 may be configured as a device, particularly a circuit device. The transmitter 210 may be configured to generate a signal at the transmitter output 218 based on the TXD signal. In the example explained above, the signal generated by the transmitter 210 may relate to two sub-signals at the two internal terminals, wherein the two sub-signals may be considered to form a common differential voltage signal. The signal generated by the transmitter 210 may also be referred to as a CAN BUS signal. Preferably, the CAN BUS signal is a differential voltage signal. In an example, the transmitter 210 is further configured to generate the CAN BUS signal based on the TXD signal such that the CAN BUS signal represents the same message as the TXD signal. Since the transmitter output 218 is coupled to the CAN BUS interface 206, the CAN BUS signal may be transmitted to the CAN bus 120. The CAN BUS signal may be received by another CAN device 102 via the CAN bus 120.

The receiver 212 of the CAN transceiver 200 is coupled between the CAN BUS interface 206 and the RXD interface 204. The RXD interface 204 is preferably a physical interface. In an example, a signal connection may extend from the CAN BUS interface 206 to an input of the receiver 212. The signal connection may comprise two lines. An output of the receiver 212 may be coupled to the RXD interface 204 via another signal connection. The receiver 212 may be configured to receive a CAN BUS signal via the CAN BUS interface 206. The receiver 212 may further be configured to generate a signal based on the CAN BUS signal. The generated signal may be referred to as an RXD signal. The RXD signal may be a digital signal. The receiver 212 may further be configured to generate the RXD signal based on the CAN BUS signal, such that the RXD signal represents the same message as the CAN BUS signal. The message may be a message according to the CAN standard.

The transmitter 210 comprises a first path 220. The first path 220 may be a signal path of the transmitter 210. The first path 220 may also be referred to as the first driver path 220. The first driver path 220 may extend in the transmitter 210 such that the first driver path 220 is coupled between a first power supply terminal 242 of the CAN transceiver 200 and a first terminal 236 of the CAN BUS interface 206. The first driver path 220 comprises a first series circuit 222, the first series circuit 222 including a first switch unit 224 and a second switch unit 226 connected in series. The first driver path 220 and/or the first series circuit 222 may comprise other electrical components. In an example, the first driver path 220 and/or the first series circuit 222 may comprise at least one additional switch unit 246 and/or at least one diode 278. The first driver path 220 is coupled to the first terminal 236 of the CAN BUS interface 206. In an example, the first driver path 220 may extend to the output 218 of the transmitter 210, wherein the first driver path 220 is coupled to the first terminal 236 of the CAN BUS interface 206 via a further signal connection.

In an example, a switch unit may be understood as a device configured to make or break an electrical connection. A switch unit may be activated or deactivated. An activated switch unit makes the electrical connection. A deactivated switch unit breaks the electrical connection. A switch unit may comprise a transistor or a circuit arrangement comprising a plurality of transistors. By means of the at least one transistor, the electrical connection can be made or broken. The at least one transistor may be configured as a field effect transistor. A switch unit may comprise two terminals between which the electrical connection extends, which may be made or broken by the switch unit. A switch unit may further comprise a control terminal. In a MOS transistor, the control terminal may be formed by the gate terminal. The control terminal may be formed as an electrical interface. The control terminal may be used to control whether the switch unit makes or breaks the electrical connection based on the control signal. The preceding explanations concerning the switch unit may apply in an analogous manner to any switch unit mentioned within the present disclosure.

The transmitter 210 further comprises a second path 228. The second path 228 may be a signal path of the transmitter 210. The second path 228 may also be referred to as a second driver path 228. The second driver path 228 may extend in the transmitter 210 such that the second driver path 228 is coupled between a second power supply terminal 244 of the CAN transceiver 200 and a second terminal 238 of the CAN BUS interface 206. The second driver path 228 comprises a second series circuit 230, and the second series circuit 230 comprises a third switch unit 232 and a fourth switch unit 234 connected in series. The second driver path 228 and/or the second series circuit 230 may comprise other electrical components. In an example, the second driver path 228 and/or the second series circuit 230 may comprise at least one additional switch unit 248 and/or at least one diode 280. The second driver path 228 is coupled to the second terminal 238 of the CAN BUS interface 206. In an example, the second driver path 228 may extend to the transmitter output 218 of the transmitter 210, wherein the second driver path 228 is coupled to the second terminal 238 of the CAN BUS interface 206 via a further signal connection.

The first driver path 220 may be formed and/or used to generate either a first voltage or a second voltage at the first terminal 236 of the CAN BUS interface 206. The first voltage may be, for example. 3.5 V. The second voltage may be, for example, 2.5 V. The second driver path 228 may be formed and/or used to generate either the second voltage or a third voltage at the second terminal 238 of the CAN BUS interface 206. For example, the third voltage may be 1.5 V. To represent a recessive bit (1), the first driver path 220 may generate the second voltage at the first terminal 236 and the second driver path 228 may generate the second voltage at the second terminal 238. In this case, the voltage difference is approximately zero. To represent a dominant bit (0), the first driver path 220 may generate the first voltage at the first terminal 236 and the second driver path 228 may generate the third voltage at the second terminal 238. The voltage difference in this case is approximately 2 V.

The transmitter 210 comprises a unit referred to as a driver unit 240. The driver unit may be configured as a device, in particular a circuit arrangement. The driver unit 240 is configured to control the first switch unit 224 and the third switch unit 232. Preferably, the driver unit 240 is configured to control the first switch unit 224 and the third switch unit 232 based on a TXD signal. The TXD signal may be received by the transceiver 200 via the TXD interface 202 and directed to the driver unit 240. In an example, the driver unit 240 of the transmitter 210 may be configured to control the first driver path 220 via the first switch unit 224 and the second driver path 228 via the second switch unit 232 such that a CAN BUS signal is generated at the transmitter output 218 of the transmitter 210 based on a TXD signal. The CAN BUS signal may be generated such that the bits of a message represented by the generated CAN BUS signal correspond to the digital bits of a message represented by the TXD signal.

It is desirable to be able to deactivate the transceiver 200 and/or the associated transmitter 210 if, for example, a faulty TXD signal is transmitted to the CAN transceiver 200 and/or if, for example, the driver unit 240 is faulty. By deactivating the transceiver 200 and/or by deactivating the transmitter 210, it is possible to prevent an unintended CAN BUS signal from being generated by the transceiver 200 at the CAN BUS interface 206. To effectuate the deactivation, interrupting the first driver path 220 and interrupting the second driver path 228 has been found to be an effective and robust measure. To interrupt the first driver path 220, it may be sufficient to deactivate one of the switch units 224, 226 of the first driver path 220. In an example, the first switch unit 224 or the second switch unit 226 may be deactivated to interrupt the first driver path 220. To interrupt the second driver path 228, it may be sufficient to deactivate one of the switch units 232, 234 of the second driver path 228. In an example, the third switch unit 232 or the fourth switch unit 264 may be deactivated to interrupt the second driver path 228.

The CAN transceiver 200 comprises the control unit 214 and the first control interface 208. The control unit 214 is coupled to the first control interface 208 to receive a first control signal via the first control interface 208. In an example, a signal connection may extend from the control interface 208 to the control unit 214. The signal connection may direct the first control signal from the first control interface 208 to the control unit 214.

The control unit 214 is coupled to at least one switch unit 224, 226 of the plurality of switch units 224, 226 of the first driver path 220. In an example, the control unit 214 is coupled to a plurality of switch units 224, 226 of the first driver path 220. The control unit 214 may be coupled to the control terminal of the respective switch unit 224, 226 of the first driver path 220. The coupling may be direct or indirect. The coupling of the control unit 214 to the respective control terminal may be established via at least one signal connection and/or further components, such as at least one further switch unit 252, 258, 262.

The control unit 214 is also coupled to at least one switch unit 232, 234 of the plurality of switch units 232, 234 of the second driver path 228. In an example, the control unit 214 is coupled to a plurality of switch units 232, 234 of the second driver path 228. The control unit 214 may be coupled to the control terminal of the respective switch unit 232, 234 of the second driver path 228. The coupling may be direct or indirect. The coupling of the control unit 214 to the respective control terminal may be established via at least one signal connection and/or further components, such as at least one further switch unit 256, 260, 264.

The control unit 214 is configured to control the switch units 224, 226, 232, 234 coupled to the control unit 214. In an example, the control unit 214 may send a signal referred to as a switch signal to each control terminal of the switch units 224, 226, 232, 234 coupled to the control unit 214. The control unit may be configured to generate and transmit an associated switch signal for each coupled switch unit 224, 226, 232, 234 to the control terminal of the associated switch unit 224, 226, 232, 234. In an example, the control unit 214 may individually activate or deactivate the coupled switch units 224, 226, 232, 234 via associated switch signals. In other words, in an example, the coupled switch units 224, 226, 232, 234 may be controlled by the control unit 214 via the switch signals to either activate or deactivate the coupled switch units 224, 226, 232, 234, respectively.

Previously, it was explained that the control unit 214 is configured to receive the first control signal via the first control interface 208. In an example, the first control signal may be generated by the microcontroller 108 and transmitted to the first control interface 208 of the CAN transceiver 200 via a signal connection from the microcontroller 108.

In an example, the first control signal may represent a deactivation message. In an example, the deactivation message may be understood as an instruction to deactivate the transmitter 210 and/or to deactivate the CAN transceiver 200. The deactivation message may be a very primitive message. The microcontroller 108 may transmit the first control signal, which in an example represents the deactivation message, to the first control interface 208 if the microcontroller 108 determines that the CAN transceiver 200 is not operating correctly or if a faulty TXD signal has been transmitted to the TXD interface 202 of the CAN transceiver 200. Other examples are also conceivable in which the first control signal 208 is transmitted, the first control signal representing the deactivation message.

The control unit 214 of the CAN transceiver 220 is configured, if the first control signal represents the deactivation message, to deactivate the at least one switch unit 224, 226, 232, 234 of each driver path 220, 228. The control unit 214 may be configured to deactivate a switch unit 224, 226 of the first series circuit 222 of the first driver path 220 if the first control signal represents the deactivation message. The control unit 214 may further be configured to deactivate a switch unit 232, 234 of the second series circuit 230 of the second driver path 228 if the first control signal represents the deactivation message.

For example, if the microcontroller 108 determines that the CAN transceiver 200 is not operating correctly or a faulty TXD signal has been transmitted to the TXD interface 202 of the CAN transceiver 200, the microcontroller 108 may transmit the first control signal to the first control interface 208 of the CAN transceiver 200. The first control interface 208 is preferably coupled to the control unit 214 via a signal connection, such that the first control signal is transmitted to the control unit 214. The control unit 214 may be configured to verify that the first control signal represents a deactivation message. If it is determined by the control unit 214 that the first control signal represents the deactivation message, the control unit 214 may deactivate at least one switch unit 224, 226, 232, 234 of each driver path 220, 228, respectively.

If a respective switch unit 224, 226, 232, 234 is deactivated in each driver path 220, 228, a CAN BUS signal is effectively prevented from being generated at the CAN BUS interface 206 by the transmitter 210 and/or the CAN transceiver 200. As an effect, it also prevents a transceiver 200 that may not be operating properly from generating an unwanted CAN BUS signal on the CAN BUS 120. However, even if the CAN transceiver 200 is operating error-free, it is possible that an erroneous TXD signal may be transmitted to the CAN transceiver 200. By deactivating at least one switch unit in each driver path 220, 228 as previously explained, it can be effectively prevented that a faulty CAN BUS signal is caused by the faulty TXD signal.

In an example, the first driver path 220 is coupled between the first power supply terminal 242 of the CAN transceiver 200 and the first terminal 236 of the CAN BUS interface 206. The second driver path 228 may be coupled between the second voltage supply terminal 244 of the CAN transceiver 200 and the second terminal 238 of the CAN BUS interface 206. The first voltage supply terminal 242 may be for connection to the supply voltage Vcc. The second voltage supply terminal 244 may be for connection to ground. If at least one switch unit 224, 226 of the first driver path 220 is deactivated, a possible influence of the supply voltage Vcc on a voltage signal at the first terminal 236 of the CAN BUS interface 206 is effectively prevented. If at least one switch unit 232, 234 of the second driver path 228 is deactivated, a possible influence of ground on a voltage signal at the second terminal 238 of the CAN BUS interface 206 is effectively prevented. If at least one switch unit 224, 226, 232, 234 of each driver path 220, 228 is deactivated, a possible influence of the supply voltage (Vcc, ground) of the CAN transceiver 200 on a voltage signal at the CAN BUS interface 206 can be effectively prevented. Even if the CAN transceiver 200 does not operate error-free and/or if an erroneous TXD signal is transmitted to the CAN transceiver 200, an undesired CAN BUS signal can be effectively prevented from being generated at the CAN BUS interface 206 in the previously mentioned example.

In an example, the first driver path 220 comprises another, fifth switch unit 246. The fifth switch unit 246 may be connected in series with the first switch unit 224 and the second switch unit 226. In an example, the fifth switch unit 246 may be comprised of the first series circuit 222. The fifth switch unit 246 may serve to limit current through the first driver path 220. The fifth switch unit 246 may be controlled by a first current limiting controller 274. The first current limiting controller 274 may be coupled to a control terminal of the fifth switch unit 246, such that current passage through the fifth switch unit 246 is controllable by the first current limiting controller 274.

In an example, the second driver path 228 comprises another, sixth switch unit 248. The sixth switch unit 248 may be connected in series with the third switch unit 232 and the fourth switch unit 234. In an example, the sixth switch unit 248 may be comprised by the second series circuit 230. The sixth switch unit 248 may serve to limit current through the second driver path 228. The sixth switch unit 248 may be controlled by a second current limiting controller 276. The second current limiting controller 276 may be coupled to a control terminal of the sixth switch unit 248, such that current passage through the sixth switch unit 248 is controllable by the second current limiting controller 276.

In an example, the driver unit 240 is coupled to a control terminal of the first switch unit 224 via a first control signal path 250. The first control signal path 250 allows the first switch unit 224 to be controlled by the driver unit 240. The driver unit 240 may further be coupled to a control terminal of the third switch unit 232 via a second control signal path 254. The third switch unit 232 is controllable by the driver unit 240 via the second control signal path 254. If the transceiver 200 is faulty due to a fault in the driver unit 240 or if the transceiver 200 is receiving a faulty TXD signal, it is desirable to prevent the driver unit 240 from controlling the first and third switch units 224, 232 to generate a CAN BUS signal. In an example, the transmitter 210 comprises a seventh switch unit 252 integrated into the first control signal path 250. Further, the transmitter 210 may comprise an eighth switch unit 256 integrated into the second control signal path 254. The control unit 214 of the CAN transceiver 200 may be coupled to the seventh and eighth switch units 252, 256 to control the seventh and eighth switch units 252, 256. In an example, a further signal connection may extend from the control unit 214 to the control terminal of the seventh switch unit 252, wherein the control unit 214 may be configured to control the seventh switch unit 252 by a switch signal via the further signal connection. Further, a further signal connection may extend from the control unit 214 to the control terminal of the eighth switch unit 256, wherein the control unit 214 may be configured to control the eighth switch unit 256 by a switch signal via the further signal connection. In an example, the control unit 214 may be configured to deactivate the seventh and eighth switch units 252, 256 if the first control signal represents a deactivation message. Deactivating the seventh and eighth switch units 252, 256 interrupts the first control signal path 250 and the second control signal path 254. As an effect, the driver unit 240 can no longer control the first and third switch units 224, 232. This effect is advantageous if the CAN transceiver 200 does not operate without errors, for example, due to a faulty driver unit 240. In this case, the faulty driver unit 240 is decoupled from the first and third switch units 224, 232.

The control unit 214 may receive the first control signal via the first control interface 208. The first control signal, which in an example represents a deactivation message, may be generated by the microcontroller 108 if the microcontroller 108 determines, for example, that the CAN transceiver 200 is not operating correctly. The first control signal representing a deactivation message may be generated by the microcontroller 108 in another example if the microcontroller 108 has generated a faulty TXD signal, for example, or if the microcontroller 108 determines that the TXD signal has been corrupted in the transmission path from the microcontroller 108 to the TXD interface 202. The first control signal, which represents a deactivation message in the aforementioned examples, can effectively prevent an unwanted CAN BUS signal from being generated at the CAN BUS interface 206 by means of the control unit 214 and the advantageous embodiment of the transmitter 210.

In an example, if the microcontroller 108 determines that the CAN transceiver 200 is operating without error, the microcontroller 108 may transmit a first control signal representing an activation message to the first control interface 208 of the CAN transceiver 200. The first control interface 208 may transmit the first control signal to the control unit 214. In the example, if the first control signal represents an activation message, the control unit 214 may activate the seventh switch unit 252 and the eighth switch unit 256 so that the first and second control signal paths 250, 254 are not interrupted (but restored). In this case, the driver unit 240 may control the first and third switch units 224, 232 to generate a CAN BUS signal at the transmitter output 218 and/or the CAN BUS interface 206 based on the TXD signal.

To prevent a faulty TXD signal or a faulty driver unit 240 from causing a faulty and undesired CAN BUS signal at the CAN BUS interface 206, the possibility of interrupting the first and second control signal paths 250, 254 by means of the seventh and eighth switch units 252, 256 was previously explained. Interrupting the first and second control signal paths 250, 254 may prevent the CAN BUS signal from being generated at the CAN BUS interface 206.

A faulty, and thus undesirable, CAN BUS signal at the CAN BUS interface 206 can potentially also occur if, for example, the current limiting controllers 274, 276 and/or the fifth and sixth switch units 246, 248 are faulty. It is desirable to prevent the aforementioned faulty CAN BUS signal. The faulty CAN BUS signal may be prevented by, for example, deactivating the first and third switch units 224, 232. This deactivation may be achieved by first interrupting the first and second control signal paths 250, 256. This interruption may be achieved by means of the seventh and eighth switch units 252, 256. The seventh and eighth switch units 252, 256 may be controlled by the control unit 214 so that the seventh and eighth switch units 252, 256 are deactivated and this deactivation interrupts the first and second control signal paths 250, 254. It is also desirable for the control unit 214 to deactivate the first and third switch units 224, 232 to interrupt the first and second driver paths 220, 228. The interruption of the two driver paths 220, 228 has the effect that the faulty and/or undesired CAN BUS signal cannot be generated.

In an example, the control unit 214 is coupled to the control terminal of the first switch unit 224 via a ninth switch unit 258 to control the first switch unit 224. In this regard, the control unit 214 is not necessarily directly coupled to the control terminal of the first switch unit 224. A signal connection may extend from the control unit 214 to a control terminal of the ninth switch unit 258, such that the ninth switch unit 258 is directly controllable by the control unit 214. The ninth switch unit 258 may be coupled between the first power supply terminal 242 and the control terminal of the first switch unit 224 via the two other terminals. If the ninth switch unit 258 is activated by the control unit 214, an electrical connection is formed between the first voltage supply terminal 242 and the control terminal of the first switch unit 224, such that deactivation of the first switch unit 224 is caused and/or even forced. The deactivation of the first switch unit 224 interrupts the first driver path 220.

The control unit 214 may further be coupled to the control terminal of the third switch unit 232 via a tenth switch unit 260 to control the third switch unit 232. In this regard, the control unit 214 is not necessarily directly coupled to the control terminal of the third switch unit 232. A signal connection may extend from the control unit 214 to a control terminal of the tenth switch unit 260, such that the tenth switch unit 260 is directly controllable by the control unit 214. The tenth switch unit 260 may be coupled between the second power supply terminal 244 and the control terminal of the third switch unit 232 via the two other terminals. If the tenth switch unit 260 is activated by the control unit 214, an electrical connection is formed between the second voltage supply terminal 244 and the control terminal of the third switch unit 232, such that deactivation of the third switch unit 232 is caused and/or even forced. The deactivation of the third switch unit 232 interrupts the second driver path 228.

The interruption of the first and second driver paths 222, 228 can effectively prevent potentially faulty parts of the transmitter 210, potentially faulty parts of the transceiver 200, and/or a potentially faulty TXD signal from resulting in a faulty and unwanted CAN BUS signal at the CAN BUS interface 206. The advantageous embodiment of the control unit 214 and the advantageous embodiment of the transmitter 210 makes it possible to avoid faulty and undesired CAN BUS signal in many cases.

Previously, it was explained that the interruption of the first and second driver paths 220, 228 may be achieved using the first and third switch units 224, 232. Alternatively or additionally, it is possible to achieve the interruption of the first and second driver paths 220, 228 using the second and fourth switch units 226, 234. The aforementioned explanations, preferred features, technical effects and advantages may apply in an analogous manner to the interruption of the first and second driver paths 220, 228 using the second and fourth switch units 226, 234.

As previously discussed, a faulty and thus undesirable CAN BUS signal at the CAN BUS interface 206 can potentially arise if, for example, the current limiting controllers 274, 276 and/or the fifth and sixth switch units 246, 248 are faulty. Furthermore, a faulty and thus undesirable CAN BUS signal may possibly arise at the CAN BUS interface 206 if, for example, the first and third switch units 224, 232 are faulty. It is desirable to prevent the aforementioned faulty CAN BUS signal.

The faulty CAN BUS signal can be prevented, for example, by deactivating the second and fourth switch units 226, 234. This deactivation can be achieved by first interrupting the first and second control signal paths 250, 256. This interruption can be achieved by means of the seventh and eighth switch units 252, 256. The seventh and eighth switch units 252, 256 may be controlled by the control unit 214 such that the seventh and eighth switch units 252, 256 are deactivated and such deactivation interrupts the first and second control signal paths 250, 254. It is also desirable for the control unit 214 to deactivate the second and fourth switch units 226, 234 to interrupt the first and second driver paths 220, 228. The interruption of the two driver paths 220, 228 prevent the faulty and/or undesired CAN BUS signal from being generated.

In an example, the control unit 214 is coupled to the control terminal of the second switch unit 226 via an eleventh switch unit 262 to control the second switch unit 226. In this regard, the control unit 214 is not necessarily directly coupled to the control terminal of the second switch unit 226. A signal connection may extend from the control unit 214 to a control terminal of the eleventh switch unit 262, such that the eleventh switch unit 262 is directly controllable by the control unit 214. Two further terminals may couple the eleventh switch unit 262 between the first and second power supply terminals 242, 244. Another terminal of the eleventh switch unit 262 may be coupled to the control terminal of the second switch unit 226. If the eleventh switch unit 262 is activated by the control unit 214, an electrical connection is formed between the first voltage supply terminal 242 and the control terminal of the second switch unit 226, such that deactivation of the second switch unit 226 is caused and/or even forced. The deactivation of the second switch unit 226 interrupts the first driver path 220.

The control unit 214 may further be coupled to the control terminal of the fourth switch unit 234 via a twelfth switch unit 264 to control the fourth switch unit 234. In this regard, the control unit 214 is not necessarily directly coupled to the control terminal of the fourth switch unit 234. A signal connection may extend from the control unit 214 to a control terminal of the twelfth switch unit 264, such that the twelfth switch unit 264 is directly controllable by the control unit 214. Two further terminals may couple the twelfth switch unit 264 between the first and second power supply terminals 242, 244. Another terminal of the twelfth switch unit 264 may be coupled to the control terminal of the fourth switch unit 234. If the twelfth switch unit 264 is activated by the control unit 214, an electrical connection is formed between the second voltage supply terminal 244 and the control terminal of the fourth switch unit 234, such that deactivation of the fourth switch unit 234 is caused and/or even forced. The deactivation of the fourth switch unit 234 interrupts the second driver path 228.

The interruption of the first and second driver paths 222, 228 can effectively prevent potentially faulty parts of the transmitter 210, potentially faulty parts of the transceiver 200, and/or a faulty TXD signal from resulting in a faulty and unwanted CAN BUS signal at the CAN BUS interface 206. Due to the advantageous embodiment of the control unit 214 and the advantageous embodiment of the transmitter 210, it is possible to avoid faulty and undesired CAN BUS signal in many cases.

In an example, the first switch unit 224 and the second switch unit 226 are arranged such that along the first driver path 220, the second switch unit 226 is arranged closer than the first switch unit 224 to the first terminal 236 of the CAN BUS interface 206. In this example, interrupting the first driver path 220 by deactivating the second switch unit 226 has the advantage that a potentially faulty first switch unit 224 cannot result in a faulty and unwanted CAN BUS signal. In an example, no other switch units are arranged in the first driver path 220 between the output 218 and the second switch unit 226. Therefore, it is preferred to perform the interruption of the first driver path 220 using a deactivation of the second switch unit 226 if necessary to potentially avoid a faulty and undesired CAN BUS signal.

In an example, the fifth switch unit 246 and the first switch unit 224 are arranged such that along the first driver path 220, the first switch unit 224 is arranged closer than the fifth switch unit 246 to the first terminal 236 of the CAN BUS interface 206. In this example, interrupting the first driver path 220 by deactivating the first switch unit 224 has the advantage that a potentially faulty fifth switch unit 246 cannot result in a faulty and unwanted CAN BUS signal.

In an example, the third switch unit 232 and the fourth switch unit 234 are arranged such that along the second driver path 228, the fourth switch unit 234 is arranged closer than the third switch unit 232 to the second terminal 238 of the CAN BUS interface 206. In this example, interrupting the second driver path 228 by deactivating the fourth switch unit 234 has the advantage that a potentially faulty third switch unit 232 cannot result in a faulty and unwanted CAN BUS signal. In an example, no other switch units are arranged in the second driver path 228 between the output 218 and the fourth switch unit 234. Therefore, it is preferred to perform the interruption of the second driver path 228 using a deactivation of the fourth switch unit 234 if necessary to potentially avoid a faulty and unwanted CAN BUS signal.

In an example, the sixth switch unit 248 and the third switch unit 232 are arranged such that along the second driver path 228, the third switch unit 232 is arranged closer than the sixth switch unit 248 to the second terminal 238 of the CAN BUS interface 206. In this example, interrupting the second driver path 228 by deactivating the third switch unit 232 has the advantage that a potentially faulty sixth switch unit 248 cannot result in a faulty and unwanted CAN BUS signal.

There is a possibility that an error-free CAN transceiver 200 receives an erroneous TXD signal via the TXD interface 202. It is desirable to prevent the faulty TXD signal from causing a faulty CAN BUS signal at the CAN BUS interface 206 of the CAN transceiver 200. The faulty CAN BUS signal may be prevented by the previously explained measures, such as interrupting the first and second driver paths 220, 228 and/or interrupting the first and second control signal paths 250, 254. The faulty CAN BUS signal may further be prevented in said example by preventing the faulty TXD signal from reaching the driver unit 240.

In an example, the TXD interface 202 of the CAN transceiver 200 is coupled to a driver input 268 of the driver unit 240 via the transmitter input 216 of the transmitter 210 and via a TXD signal path 266. The driver input 268 may be a physical or logical interface. The CAN transceiver 200, and preferably the associated transmitter 210 may comprise a thirteenth switch unit 270 that is integrated into the TXD signal path 266. The thirteenth switch unit 270 may be integrated into the TXD signal path 266 in such a manner as to make or break the TXD signal path 266. The TXD signal path 266 may extend from the TXD interface 202, through the transmitter input 216, to the input of the driver unit 240 referred to as the driver input 268. In an example, the thirteenth switch unit 270 is disposed in the transmitter 210. In another example, the thirteenth switch unit 270 may be disposed in the CAN transceiver 200 but outside the transmitter 210. In both examples, it is possible that the TXD signal path 266 can be made or broken using the thirteenth switch unit 270. The control unit 214 is coupled to the thirteenth switch unit 270 to control the thirteenth switch unit 270. In an example, a signal connection may extend from the control unit 214 to a control terminal of the thirteenth switch unit 270 such that the thirteenth switch unit may be activated or deactivated using the control unit 214. The control unit 214 may be configured to deactivate the thirteenth switch unit 270 if the first control signal represents a deactivation message. In an example, if the microcontroller 108 determines that an erroneous TXD signal is currently being sent to the TXD interface 202 of the CAN transceiver 200, the microcontroller 108 may transmit the first control signal representing the deactivation message to the first control interface 208 of the CAN transceiver 200, such that the control unit 214 deactivates the thirteenth switch unit 270 based on the deactivation message. The deactivation of the thirteenth switch unit 270 prevents the erroneous TXD signal from reaching the driver unit 240.

In an example, the CAN transceiver 200 comprises a second control interface 272, wherein the control unit 214 is coupled to the second control interface 272 to receive a second control signal. A signal connection may extend from the second control interface 272 to the control unit 214. If the second control signal is transmitted to the second control interface 272, the second control signal may reach the control unit 214 via the signal connection. The control unit 214 may be configured to control the CAN transceiver 200 based on the second control signal.

In an example, the second control signal may represent an operating mode intended for the CAN transceiver 200. The control unit 214 may be configured to control the CAN transceiver 200 based on the second control signal such that the CAN transceiver 200 changes to or remains in an operating mode corresponding to the operating mode represented by the second control signal. In an example, the CAN transceiver 200 may operate in an activated mode of operation or in a deactivated mode of operation. Other modes of operation may be possible. It is desirable that the CAN transceiver 200 can generate a CAN BUS signal based on a received TXD signal in the activated mode of operation. It is also desirable that the CAN transceiver 200 does not generate a CAN BUS signal in the deactivated mode of operation.

In an example, the control unit 214 is configured to deactivate at least one switch unit 224, 226, 246, 232, 234, 248 of each driver path 220, 228 if the first control signal represents a deactivation message and/or if the second control signal represents a deactivated mode of operation. In this example, either control signal may prevent the generation of a CAN BUS signal if required.

In another example, the control unit 214 is configured to activate the second, fourth, seventh, eighth, and thirteenth switch units 226, 234, 252, 256, 270 if the second control signal represents an activated mode of operation and if (simultaneously) the first control signal does not represent a deactivation message (but in an example represents an activation message). Activation of the seventh and eighth switch units 252, 256 couples the driver unit 240 to the first and third switch units 224, 232 through established control signal paths 250, 254. Activation of the second and fourth switch units 226, 234 do not interrupt the two driver paths 220, 228. Activation of the thirteenth switch unit 270 may allow a TXD signal from the TXD interface 202 to reach the driver unit 240. The driver unit 240 may be configured to control the first and third switch units 224, 232 based on the TXD signal so as to generate a CAN BUS signal representing a message corresponding to the message represented by the TXD signal. In the above example, the CAN transceiver 200 may therefore be used as a common CAN transceiver 200, at least in the sense that the CAN transceiver 200 generates a CAN BUS signal based on a TXD signal.

In an example, the control unit 214 may be configured to activate the second, fourth, seventh, and eighth switch units 226, 234, 252, 256 and deactivate the thirteenth switch unit 270 if the second control signal represents a deactivated mode of operation and if the first control signal does not represent a deactivation message (but, in an example, represents an activation message). In this example, the second control signal may cause the thirteenth switch unit 270 to be deactivated. In this example, the first control signal may cause the second, fourth, seventh, and eighth switch units 226, 234, 252, 256 to be activated.

Figure 4:
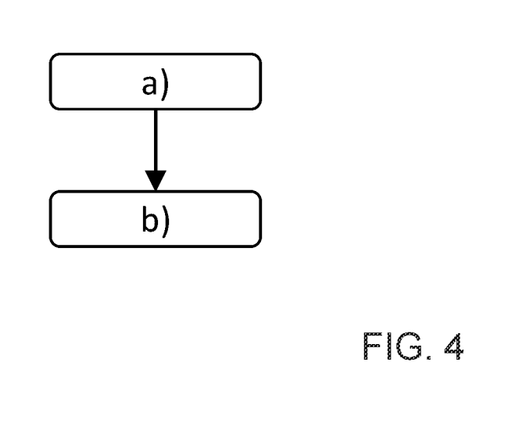
FIG. 4 shows depicts a simplified flow chart of a method for the CAN transceiver.

The present disclosure also relates to a method for a CAN transceiver 200. FIG. 4 schematically illustrates an example flowchart of the method. The method may comprise the following steps: a) receiving a first control signal by the control unit 214 via the first control interface 208; and b) controlling by the control unit 214 the switch units 214, 232 coupled to the control unit 214 if the first control signal represents a deactivation message, such that at least one switch unit 224, 232 of each driver path 220, 228 is deactivated.

With respect to the method, reference is made to the advantageous explanations, preferred features, technical effects and advantages in an analogous manner as already explained previously in connection with the CAN transceiver 200.

Although the described exemplary embodiments disclosed herein focus on devices, systems, and methods for using same, the present disclosure is not necessarily limited to the example embodiments illustrate herein. For example, various embodiments of providing The systems and methods described herein may at least partially be embodied by a computer program or a plurality of computer programs, which may exist in a variety of forms both active and inactive in a single computer system or across multiple computer systems. For example, they may exist as software program(s) comprised of program instructions in source code, object code, executable code or other formats for performing some of the steps. Any of the above may be embodied on a computer-readable medium, which may include storage devices and signals, in compressed or uncompressed form.

As used herein, the term "computer" refers to any electronic device comprising a processor, such as a general-purpose central processing unit (CPU), a specific-purpose processor or a microcontroller. A computer is capable of receiving data (an input), of performing a sequence of predetermined operations thereupon, and of producing thereby a result in the form of information or signals (an output). Depending on the context, the term "computer" will mean either a processor in particular or more generally a processor in association with an assemblage of interrelated elements contained within a single case or housing.

The term "processor" or "processing unit" refers to a data processing circuit that may be a microprocessor, a co-processor, a microcontroller, a microcomputer, a central processing unit, a field programmable gate array (FPGA), a programmable logic circuit, and/or any circuit that manipulates signals (analog or digital) based on operational instructions that are stored in a memory. The term "memory" refers to a storage circuit or multiple storage circuits such as read-only memory, random access memory, volatile memory, non-volatile memory, static memory, dynamic memory, Flash memory, cache memory, and/or any circuit that stores digital information.

As used herein, a "computer-readable medium" or "storage medium" may be any means that can contain, store, communicate, propagate, or transport a computer program for use by or in connection with the instruction execution system, apparatus, or device. The computer-readable medium may be, for example but not limited to, an electronic, magnetic, optical, electromagnetic, infrared, or semiconductor system, apparatus, device, or propagation medium. More specific examples (non-exhaustive list) of the computer-readable medium may include the following: an electrical connection having one or more wires, a portable computer diskette, a random-access memory (RAM), a read-only memory (ROM), an erasable programmable read-only memory (EPROM or Flash memory), an optical fiber, a portable compact disc read-only memory (CDROM), a digital versatile disc (DVD), a Blu-ray disc (BD), and a memory card.

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

Unless stated otherwise, terms such as "first" and "second" are used to arbitrarily distinguish between the elements such terms describe. Thus, these terms are not necessarily intended to indicate temporal or other prioritization of such elements.

The invention claimed is:

1. A Controller Area Network, CAN, transceiver, comprising:
 a transmit data, TXD, interface, a receive data, RXD, interface, a CAN BUS interface, a first control interface,
 a transmitter, a receiver, and a control unit,
 wherein a transmitter input of the transmitter is coupled to the TXD interface for receiving a TXD signal,
 wherein a transmitter output of the transmitter is coupled to the CAN BUS interface,
 wherein the receiver is coupled between the CAN BUS interface and the RXD interface,
 wherein the transmitter comprises a first driver path comprising a first series circuit, which comprises a first switch unit and a second switch unit, wherein the transmitter comprises a second driver path comprising a second series circuit, which comprises a third switch unit and a fourth switch unit, wherein the first driver path is coupled to a first terminal of the CAN BUS interface and the second driver path is coupled to a second terminal of the CAN BUS interface, wherein the transmitter comprises a driver unit configured to control the first switch unit and the third switch unit based on the TXD signal, wherein the control unit is coupled to the first control interface for receiving a first control signal, wherein the control unit is coupled to at least one switch unit of the first driver path and to at least one switch unit of the second driver path to control the switch units coupled to the control unit, wherein the control unit is configured, if the first control signal represents a deactivation message, to deactivate at least one switch unit of each driver path, wherein the first driver path comprises a further, fifth switch unit and the second driver path comprises a further, sixth switch unit, wherein the driver unit is coupled to a control terminal of the first switch unit via a first control signal path, the transmitter comprising a seventh switch unit integrated into the first control signal path, wherein the driver unit is coupled to a control terminal of the third switch unit via a second control signal path, wherein the transmitter comprises an eighth switch unit integrated into the second control signal path, wherein the control unit is coupled to the seventh and eighth switch units to control the seventh and eighth switch units, and wherein the control unit is configured, if the first control signal represents the deactivation message, to deactivate the seventh and eighth switch units.

2. The CAN transceiver of claim 1, wherein the first driver path is coupled between a first voltage supply terminal of the CAN transceiver and the first terminal of the CAN BUS interface, and wherein the second driver path is coupled between a second voltage supply terminal of the CAN transceiver and the second terminal of the CAN BUS interface.

3. The CAN transceiver of claim 1, wherein the control unit is coupled to the control terminal of the first switch unit via a ninth switch unit to control the first switch unit, wherein the control unit is coupled to the control terminal of the third switch unit via a tenth switch unit to control the third switch unit, and wherein the control unit is configured, if the first control signal represents the deactivation message, to deactivate the first and third switch units.

4. The CAN transceiver of claim 3, wherein the control unit is coupled to a control terminal of the second switch unit via an eleventh switch unit to control the second switch unit, wherein the control unit is coupled to a control terminal of the fourth switch unit via a twelfth switch unit to control the fourth switch unit, and wherein the control unit is configured, if the first control signal represents the deactivation message, to deactivate the second and fourth switch units.

5. The CAN transceiver of claim 3, wherein the control unit is coupled to a control terminal of the second switch unit via an eleventh switch unit to control the second switch unit, wherein the control unit is coupled to a control terminal of the fourth switch unit via a twelfth switch unit to control the fourth switch unit, and wherein the control unit is configured, if the first control signal represents the deactivation message, to deactivate the second and fourth switch units.

6. The CAN transceiver of claim 1, wherein the first and second switch units of the first driver path are arranged such that along the first driver path the second switch unit is arranged closer than the first switch unit to the first terminal of the CAN BUS interface.

7. The CAN transceiver of claim 1, wherein the fifth and first switch units of the first driver path are arranged such that along the first driver path that the first switch unit is arranged closer than the fifth switch unit to the first terminal of the CAN BUS interface.

8. The CAN transceiver of claim 1, wherein the third and fourth switch units of the second driver path are arranged such that along the second driver path the fourth switch unit is arranged closer than the third switch unit to the second terminal of the CAN BUS interface.

9. The CAN transceiver of claim 1, wherein the third and fourth switch units of the second driver path are arranged such that along the second driver path the fourth switch unit is arranged closer than the third switch unit to the second terminal of the CAN BUS interface, wherein the sixth and third switch units of the second driver path are arranged such that along the second driver path the third switch unit is arranged closer than the sixth switch unit to the second terminal of the CAN BUS interface.

10. The CAN transceiver of claim 4, wherein the TXD interface is coupled to a driver input of the driver unit via the transmitter input and a TXD signal path, wherein the transmitter comprises a thirteenth switch unit integrated with the TXD signal path, wherein the control unit is coupled to the thirteenth switch unit to control the thirteenth switch unit, and wherein the control unit is configured, if the first control signal represents the deactivation message, to deactivate the thirteenth switch unit.

11. The CAN transceiver of claim 4, wherein the TXD interface is coupled to a driver input of the driver unit via the transmitter input and a TXD signal path, wherein the transmitter comprises a thirteenth switch unit integrated with the TXD signal path, wherein the control unit is coupled to the thirteenth switch unit to control the thirteenth switch unit, and wherein the control unit is configured, if the first control signal represents the deactivation message, to deactivate the thirteenth switch unit.

12. The CAN transceiver of claim 10, wherein the CAN transceiver comprises a second control interface, wherein the control unit is coupled to the second control interface to receive a second control signal, wherein the control unit is configured to control the CAN transceiver based on the second control signal.

13. The CAN transceiver of claim 12, wherein the control unit is configured, if the second control signal represents a deactivated mode of operation and if the first control signal does not represent the deactivation message, to activate the second, fourth, seventh, and eighth switch units and to deactivate the thirteenth switch unit.

14. The CAN transceiver of claim 1, wherein the CAN transceiver comprises a second control interface, wherein the control unit is coupled to the second control interface to receive a second control signal, wherein the control unit is configured to control the CAN transceiver based on the second control signal.

15. The CAN transceiver of claim 12, wherein the control unit is configured to activate the second, fourth, seventh, eighth, and thirteenth switch units if the second control signal represents an activated mode of operation and if the first control signal does not represent the deactivation message.

16. The CAN transceiver of claim 15, wherein the control unit is configured, if the second control signal represents a deactivated mode of operation and if the first control signal does not represent the deactivation message, to activate the second, fourth, seventh, and eighth switch units and to deactivate the thirteenth switch unit.

17. A method for a Control Area Network, CAN, transceiver comprising a transmit data, TXD, interface, a receive data, RXD, interface, a CAN BUS interface, a first control interface, a transmitter, a receiver, and a control unit, wherein a transmitter input of the transmitter is coupled to the TXD interface to receive a TXD signal, wherein a transmitter output is coupled to the CAN BUS interface, wherein the receiver is coupled between the CAN BUS interface and the RXD interface, wherein the transmitter comprises a first driver path comprising a first series circuit, which comprises a first switch unit and a second switch unit, wherein the transmitter comprises a second driver path comprising a second series circuit, which comprises a third switch unit and a fourth switch unit, wherein the first driver path comprises a fifth switch unit, wherein the second driver path comprises a sixth switch unit, wherein the first driver path is coupled to a first terminal of the CAN BUS interface and the second driver path is coupled to a second terminal of the CAN BUS interface, wherein the transmitter comprises a driver unit configured to control the first switch unit and the third switch unit based on the TXD signal, wherein the control unit is coupled to the first control interface, wherein the control unit is coupled to at least one switch unit of the first driver path and to at least one switch unit of the second driver path, wherein the driver unit is coupled to a control terminal of the first switch unit via a first control signal path, the transmitter comprising a seventh switch unit integrated into the first control signal path, wherein the driver unit is coupled to a control terminal of the third switch unit via a second control signal path, wherein the transmitter comprises an eighth switch unit integrated into the second control signal path, wherein the control unit is coupled to the seventh and eighth switch units to control the seventh and eighth switch units, and wherein the method comprises the following steps:

receiving a first control signal by the control unit via the first control interface;

controlling by the control unit the switch units coupled to the control unit if the first control signal represents a deactivation message, such that at least one switch unit of each driver path is deactivated; and in response to the first control signal representing the deactivation message, deactivating the seventh and eighth switch units.

\* \* \* \* \*